United States Patent
Moon et al.

(10) Patent No.: US 8,201,420 B2
(45) Date of Patent: Jun. 19, 2012

(54) APPARATUS FOR MANUFACTURING FLOAT GLASS

(75) Inventors: Won-Jae Moon, Seoul (KR); Sang-Oeb Na, Seoul (KR); Yang-Han Kim, Goyang-si (KR); Hyung-Young Oh, Goyang-si (KR); Young-Sik Kim, Seoul (KR); Kil-Ho Kim, Suwon-si (KR); Heui-Joon Park, Incheon (KR); Chang-Hee Lee, Osan-si (KR)

(73) Assignee: LG Chem, Ltd., Seoul (KR)

( * ) Notice: Subject to any disclaimer, the term of this patent is extended or adjusted under 35 U.S.C. 154(b) by 281 days.

(21) Appl. No.: 12/705,289

(22) Filed: Feb. 12, 2010

(65) Prior Publication Data

US 2010/0206011 A1 Aug. 19, 2010

(30) Foreign Application Priority Data

Feb. 13, 2009 (KR) ........................ 10-2009-0011981

(51) Int. Cl.
*C03B 18/02* (2006.01)
*C03B 18/16* (2006.01)
*C03B 18/18* (2006.01)

(52) U.S. Cl. ........................ 65/182.3; 65/99.4

(58) Field of Classification Search ............. 65/199, 65/90, 99.4, 182.3

See application file for complete search history.

(56) References Cited

U.S. PATENT DOCUMENTS 3,525,601 A * 8/1970 Ohsato ............................ 65/168
4,012,216 A * 3/1977 Marchand ...................... 65/99.3

FOREIGN PATENT DOCUMENTS

JP 45-30711 10/1970
JP 2000-128552 5/2000

OTHER PUBLICATIONS

Machine translation of JP-2000128552A.*

* cited by examiner

*Primary Examiner* — Matthew Daniels
*Assistant Examiner* — Cynthia Szewczyk
(74) *Attorney, Agent, or Firm* — McKenna Long & Aldridge LLP

(57) ABSTRACT

An apparatus for manufacturing a float glass, including a float bath for storing a molten metal on which a molten glass flows, wherein the molten metal flows in the float bath, comprises a discharge slot having substantially the same size as width of the molten glass to discharge a molten metal crashing against a wall of a downstream end of the float bath and dross floating on the molten metal, and formed through the wall substantially parallel to a traveling direction of the molten glass; connecting channels for communicating the discharge slot with both sides of the float bath; and dross collecting members for collecting the dross.

5 Claims, 3 Drawing Sheets

APPARATUS FOR MANUFACTURING FLOAT GLASS

CROSS-REFERENCE TO RELATED APPLICATION

This application claims priority to Korean Patent Application No. 10-2009-0011981 filed in Republic of Korea on Feb. 13, 2009, the entire contents of which are incorporated herein by reference.

BACKGROUND OF THE INVENTION

1. Field of the Invention

The present invention relates to an apparatus for manufacturing a float glass, and more particularly, to an apparatus for manufacturing a float glass using a float glass process.

2. Description of the Related Art

Generally, an apparatus for manufacturing a float glass (also known as a sheet glass, a flat glass or a plate glass) using a float glass process is used to manufacture a continuous sheet of glass having a ribbon shape of a predetermined width by continuously supplying a molten glass onto a flowing molten metal (a molten tin and so on) stored in a float bath while floating the molten glass on the molten metal to form a molten glass ribbon reaching around an equilibrium thickness due to the surface tension and gravity, and pulling up the molten glass ribbon toward an annealing lehr near an exit of the float bath.

Here, the molten metal includes, for example, a molten tin or a molten tin alloy, and has a greater specific gravity than the molten glass. The molten metal is received in a float chamber where a reducing atmosphere of hydrogen ($H_2$) and/or nitrogen ($N_2$) gas is introduced. The float bath in the float chamber is configured to contain the molten metal therein. The float bath has a horizontally extending structure, and includes a high heat resistant material (for example, bottom blocks) therein. The molten glass forms a molten glass ribbon on the surface of the molten metal while moving from an upstream end of the float bath to a downstream end. The molten glass ribbon is lifted up at a location set on the downstream end of the float bath, so called a take-off point, to be removed from the molten metal, and delivered to an annealing lehr of a next process.

However, because the molten metal in the float chamber is in a high-temperature state (for example, about 600 to 1100° C.), chemical reactions take place among the molten metal, the molten glass, $H_2$ and $N_2$ of the atmosphere, a very small amount of $O_2$, $H_2O$ and S to generate impurities that are referred to as "dross". In particular, temperature is lower at and around the take-off point on the downstream end (Cold End) of the float bath than the upstream end (Hot End). Thus, solubility of the molten metal decreases on the downstream end, and consequently, metal oxide dross, for example $SnO_2$, etc. is liable to happen and accumulate on the downstream end. When the molten glass ribbon is lifted up from the take-off point, the dross is attached to the bottom of the molten glass ribbon and drawn from the float bath, accompanied by the molten glass ribbon. As a result, it causes scratch, stain and so on that may unfavorably influence a subsequent process and/or the quality of float glass products.

To solve the problems, various techniques have been developed so far. For example, as disclosed in Japanese Patent Publication No. SO45-30711, a conventional apparatus for manufacturing a float glass includes a collecting channel having an approximately T-shaped pocket of which a plane expands slightly in a widthwise direction by a side wall and a rear wall of a longitudinal end portion of a float bath. The collecting channel is formed at a predetermined angle so that dross gathered in the collecting channel from an exposed drainage area can be guided to the pocket. The dross is discharged from the pocket outside the float bath.

As disclosed in Japanese Patent Laid-open Publication No. 2000-128552, another conventional apparatus for manufacturing a float glass includes a first flow channel extending in a cross direction with respect to a draw-out direction of the float glass, and a second flow channel connected to an end of the first flow channel and communicated with a dam starting from the outside of a side wall. The apparatus flows back a molten metal from a downstream end of a float bath to an upstream end through separate flow channels.

However, these conventional techniques remove dross, which was caused by contamination in a float bath, at both sides of a downstream end of the float bath. However, the conventional techniques have difficulty in removing dross accumulated under the center of a molten glass ribbon at the downstream end, and to remove such dross, it should open a side sealing with a separate strap-shaped tool made of wood. Under this operational environment, when the side sealing is open, the float bath may be further contaminated and safety in operation may be not guaranteed. As a result, it may deteriorate the quality of float glass products and the procedural stability.

SUMMARY OF THE INVENTION

The present invention is designed to solve the above-mentioned problems, and therefore it is an object of the present invention to provide an improved apparatus for manufacturing a float glass, which has a discharge slot of a substantially same size as width of a molten glass in the widthwise direction of a 'lip block' located at a downstream end among floor blocks of a float bath. The apparatus flows back the molten metal flown in through the discharge slot toward the sides of the float bath, thereby stably removing dross floating on the molten metal.

To achieve the object, an apparatus for manufacturing a float glass according to the present invention, including a float bath for storing a molten metal on which a molten glass flows, wherein the molten metal flows in the float bath, comprises a discharge slot having substantially the same size as width of the molten glass to discharge a molten metal crashing against a wall of a downstream end of the float bath and dross floating on the molten metal, and formed through the wall substantially parallel to a traveling direction of the molten glass; connecting channels for communicating the discharge slot with both sides of the float bath; and dross collecting members for collecting the dross flowing through the connecting channels.

Preferably, the discharge slot has an inlet having substantially the same height as the level of the molten metal to allow an overflow of the molten metal; and a slope surface slanted away from the inlet.

Preferably, each of the dross collecting members comprises a collecting box provided at one side of the downstream end of the float bath and communicated with the corresponding connecting channel; and a paddle installed rotatably at an entrance of the collecting box for scraping the dross floating on the molten metal flown back along one side of the float bath and collecting the dross in the collecting box.

Preferably, the apparatus of the present invention further comprises a heating unit for heating the molten metal flowing through the discharge slot and the connecting channels.

Preferably, the heating unit has a heater.

EFFECTS OF THE PRESENT INVENTION

The apparatus for manufacturing a float glass according to the present invention effectively flows back dross (impurities) accumulated near a lip block at a downstream end of a float bath toward both sides of the float bath, thereby improving the quality of float glass products and ensuring the procedural stability.

BRIEF DESCRIPTION OF THE DRAWINGS

The accompanying drawings illustrate the preferred embodiments of the present invention and are included to provide a further understanding of the spirit of the present invention together with the detailed description of the invention, and accordingly, the present invention should not be limitedly interpreted to the matters shown in the drawings

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
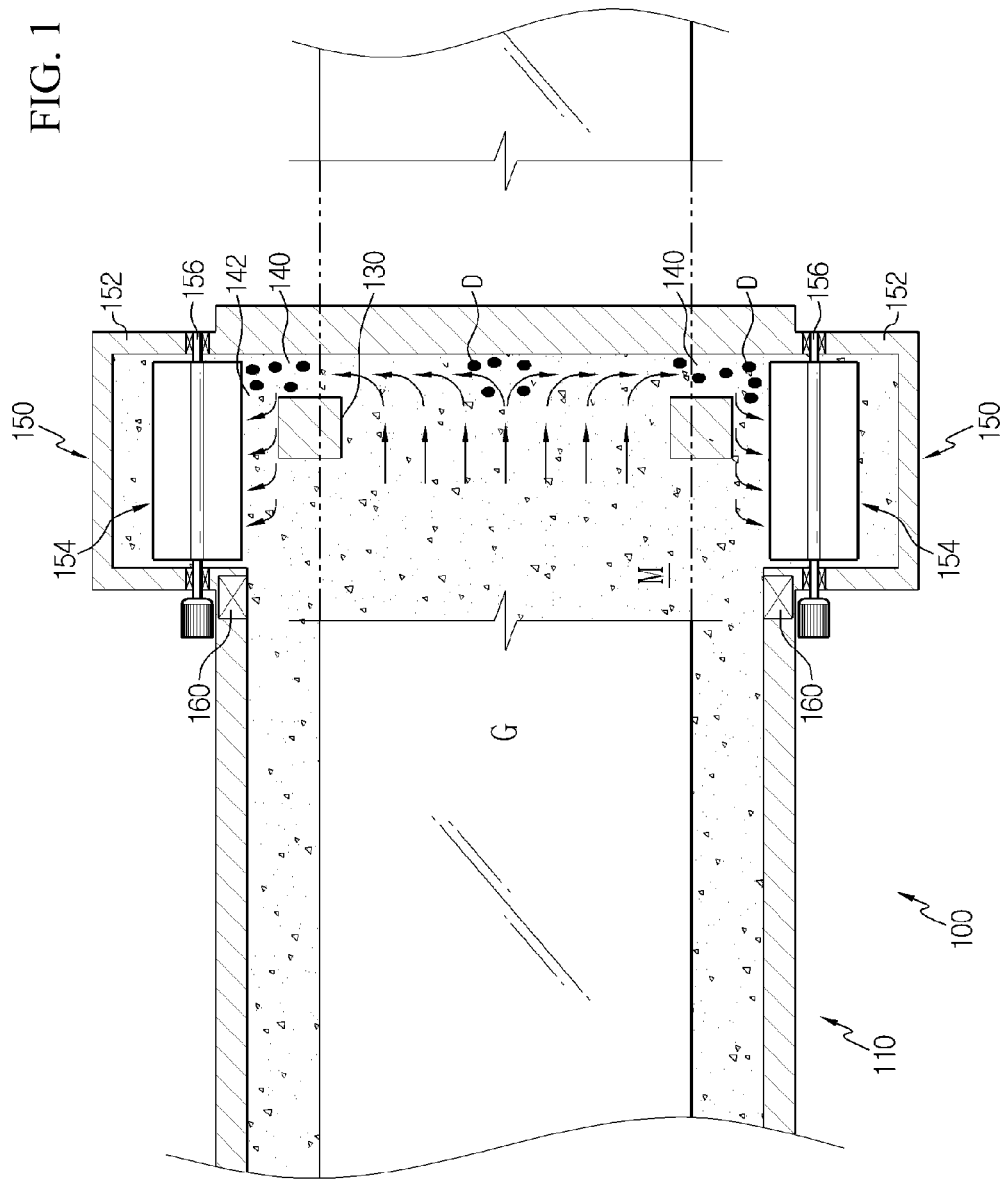
FIG. 1 is a schematic plan view of an apparatus for manufacturing a float glass according to a preferred embodiment of the present invention.
Figure 2:
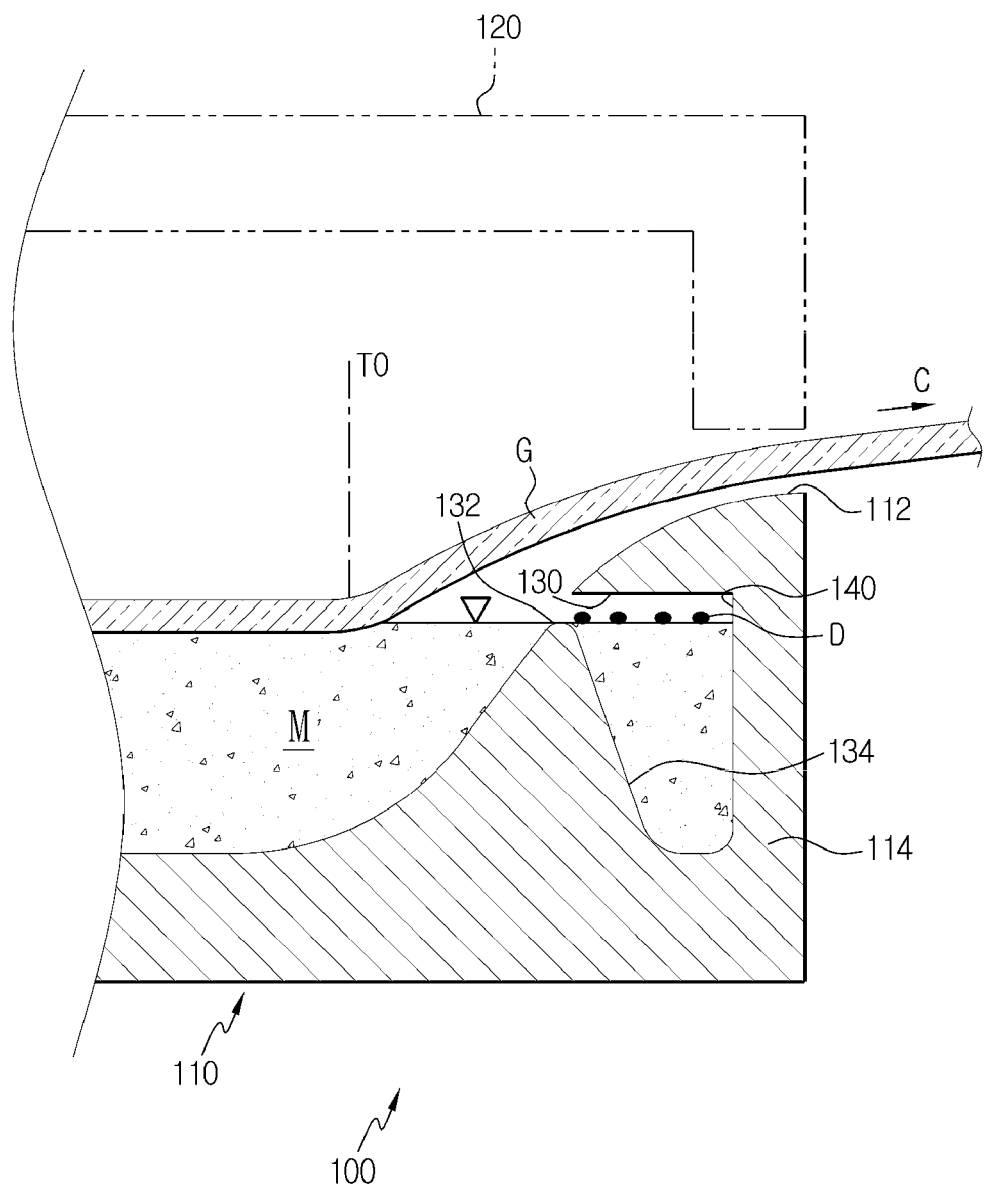
FIG. 2 is a side view of FIG. 1.

FIG. 1 is a schematic plan view of an apparatus for manufacturing a float glass according to a preferred embodiment of the present invention. FIG. 2 is a side view of FIG. 1.

Referring to FIGS. 1 and 2, the apparatus 100 for manufacturing a float glass according to an embodiment of the present invention is configured to manufacture a float glass using a so-called float glass process. The apparatus 100 includes a float chamber, and the float chamber has a float bath 110 located at a lower portion thereof and a roof 120 covering the top of the float bath 110. The float chamber is an airtight type that has an input port (not shown) and an output port 112.

The float bath 110 stores a molten metal (M) such as a molten tin, a molten tin alloy and so on. The molten metal (M) is supplied from an upstream end of the float bath 110 (shown at the left side of the drawing) and moves to a downstream end (shown at the right side of the drawing) by a molten glass (G). The molten metal (M) flows from the upstream end of the float bath 110 to the downstream end due to a temperature gradient in the float bath 110 and at the same time, flows from the center of the float bath 110 to both sides of the float bath 110. The temperature gradient is a difference in temperature between the downstream end and the upstream end which is maintained at a relatively higher temperature. The molten glass (G) also flows from the upstream end of the float bath 110 to the downstream end, and is pulled upwards at a take-off point (TO) to be removed from the surface of the molten metal (M) and then drawn out toward an annealing Lehr (not shown) of a next process (See arrow C).

The atmosphere in the float chamber is formed by a mixed gas of nitrogen and hydrogen. The mixed gas is maintained at pressure slightly higher than the external atmosphere, and the molten metal (M) and a ribbon of the molten glass (G) are maintained at about 800 to 1300° C. by an electric heater (not shown). The molten glass (G) is a nonalkaline glass, a soda-lime glass, and so on. The principle and structure for flow generation of the molten metal (M) in the float bath 110, and input, ribbonization, movement and discharge of the molten glass (G) are well known in a typical float glass process, and the detailed description is omitted herein.

The float bath 110 has a discharge slot 130, connecting channels 140 and dross collecting members 150. The discharge slot 130 runs through approximately entirely a wall of the downstream end, or a lip block 114. The connecting channels 140 are communicated with the discharge slot 130 and the sides of the float bath 110. The dross collecting members 150 are configured to collect a molten metal (M) and dross (D) flown through the connecting channel 140.

The discharge slot 130 is configured to discharge the molten metal (M) crashing against the center of the lip block 114 that is a wall of the downstream end, and dross (D) that may float on the molten metal (M). The discharge slot 130 has a predetermined size that is slightly shorter than the width of a molten glass (G) relative to the edge of the lip block 114. That is, the discharge slot 130 is formed to have a predetermined width and a substantially rectangular cross section.

The discharge slot 130 has an inlet 132 and a slope surface 134. The inlet 132 has substantially the same height as the level of the molten metal (M) to allow an overflow of the molten metal (M). The slope surface 134 is slanted away from the inlet 132. Preferably, a maximum depth of the slope surface 134 is substantially equal to the depth of the float bath 110.

The connecting channels 140 communicate with the discharge slot 130, and are formed inside of the lip block 114 substantially parallel to the widthwise direction of the float bath 110 so as to flow back the molten metal (M) and impurities or dross (D) flown in through the discharge slot 130 toward both sides of the float bath 110. And, the connecting channels 140 are connected with side holes 142 communicated with the both sides of the float bath 110.

The discharge slot 130 and the connecting channels 140 may be formed by modifying the lip block 114 and piping to the modified lip block, or may be designed and formed from the beginning.

Figure 3:
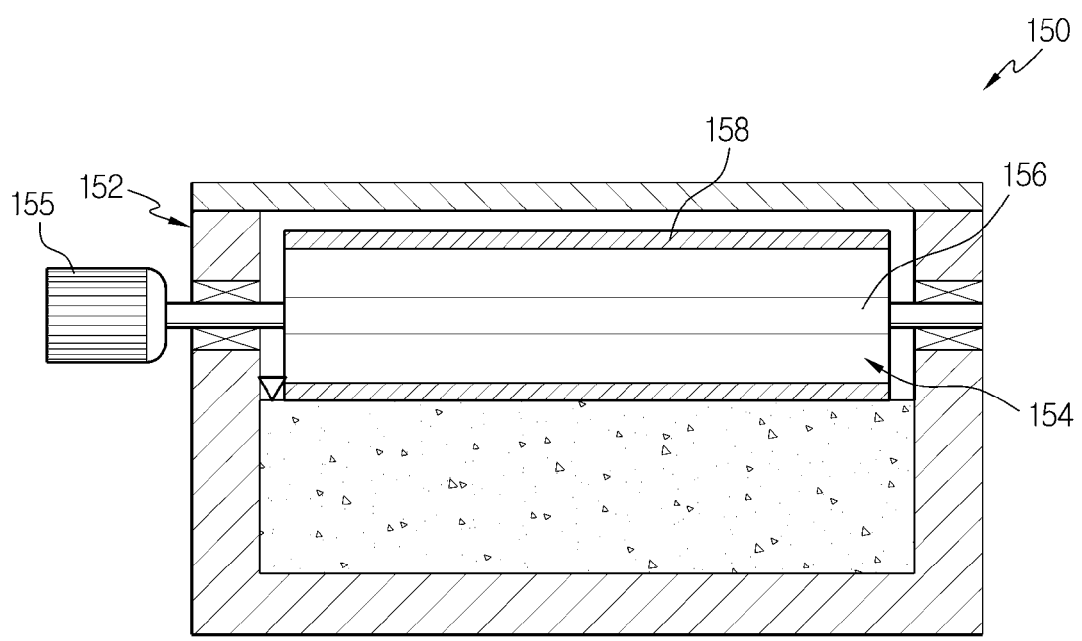
FIG. 3 is a schematic cross-sectional view of a dross collecting member of FIG. 1.

As shown in FIG. 3, each of the dross collecting members 150 comprises a collecting box 152 and a paddle 154. The collecting box 152 is located at each opposing side of the downstream end of the float bath 110 and communicated with the corresponding connecting channel 152. The paddle 154 is rotatably installed at or near an entrance of the collecting box 152 to scrape the dross (D) floating on the molten metal (M) flown back along the both sides of the float bath 110 and to collect the dross (D) in the collecting boxes 152.

The collecting box 152 is provided separately from the float bath 110, and has a sufficient size to receive the flow of molten metal (M) flowing back from the downstream end of the float bath 110. Preferably, the same airtight atmosphere as the float bath 110 is created in the collecting box 152. The collecting box 152 has a separate door (not shown) capable of selectively opening in order to completely remove the dross (D) flown therein from the float bath 110.

The paddle 154 has a plurality of blades 158 about a rotation axis 156 installed in the side wall of the collecting box 152. The rotation axis 156 is rotated at a predetermined rate by a driving source 155 such as a motor or the like. The blades 158 are arranged such that their rotating edges are substantially at the same location as the level of the molten metal (M) at the entrance of the collecting box 152. In other words, the location relationship between the edges of the blades 158 and the molten metal (M) is sufficient if the dross (D) floating on the molten metal (M) can be scraped and collected in the collecting box 152 by the paddle 154 without any substantial influence on the flow of the molten metal (M) when the blades 158 rotate by rotation of the rotation axis 156.

According to the above-mentioned embodiment, the dross (D) generated at and around the take-off point (TO) of the float bath 110 flows farther to the downstream end through the discharge slot 130 and then flows back to both sides of the downstream end of the float bath 110 through the connecting channels 140. Through this flow-back process, the dross (D) flows into the collecting box 152 by rotation of the blades 158 of the paddle 154. Thereby a kind of ceiling is formed by the lip block 114 at the discharge slot 130 and the top of the connecting channels 140. Accordingly, it can prevent dross (D) existing on a traveling route of the molten glass (G) from attaching to the flowing molten glass (G). In particular, it can prevent attachment of the dross (D) throughout the entire width of the molten glass (G), thereby reducing a defective rate of float glass.

Meanwhile, the dross (D) floating on the molten metal (M) may be collected by a separate collecting means (not shown). The collecting means may be provided near the discharge slot 130 or the connecting channels 140, or at each opposing side of the downstream end of the float bath 110. Here, the collecting means may include, for example, an equipment for decomposing dross (D) by heating the molten metal (M), an equipment for separating dross (D) by cooling the molten metal (M) and mechanically capturing the separated dross (D), and so on.

According to the embodiment of the present invention, the apparatus 100 for manufacturing a float glass may further comprise heating units 160. The heating units 160 are arranged at the corresponding connecting channels 140 to increase the temperature of the molten metal (M) that was cooled while flowing along the connecting channels 140. The heating units 160 may be an electric heater, and are configured to solve the problem that an unnecessary gas may be produced due to the decreased temperature of the molten metal (M) at the downstream end of the float bath 110.

In an alternative embodiment of the present invention, the float bath 110 may further have a linear motor (not shown) for generating a back flow of the molten metal (M) and the dross (D) in the discharge slot 130 and the connecting channels 140 by applying a traveling magnetic field to the molten metal (M) flown in through the discharge slot 130. The linear motor may be provided with an arbitrary number on the surface of the molten metal (M), or at the side, the bottom or other locations in the discharge slot 130 and/or the connecting channels 140 of the float bath 110. The linear motor can directly drive the molten metal (M) in a noncontact manner, and thus it has an advantage of easy flow control. The linear motor generates a traveling magnetic field in a predetermined direction by forming a comb-shaped primary coil around a core, applying a three-phase alternating current voltage to the coil, and magnetizing the coil. The generated traveling magnetic field provides a driving force to the molten metal (M). The flow control of the molten metal (M) may be preset before operation of the apparatus for manufacturing a float glass or may be set in the middle of producing a glass after operation of the apparatus for manufacturing a float glass according to necessity. When the linear motor operates to excite the traveling magnetic field, a back flow of the molten metal (M) is generated in the discharge slot 130 and the connecting channels 140. That is, the molten metal (M), on which dross may float, passes through the discharge slot 130 from the downstream end, moves along the connecting channels 140 and flows back to both sides of the float bath 110 through the side holes 142.

Meanwhile, the present invention is not limited to the above-mentioned embodiments, and proper modifications and improvements may be made thereto. And, it is possible to arbitrarily select the material, shape, size, type, number, location, etc. of the float bath, the molten metal, the molten glass, the take-off point, the discharge slot, the connecting channels, the dross collecting members, etc. within the ranges to achieve the object of the present invention, however the present invention is not limited in this regard.

As mentioned above, the apparatus for manufacturing a float glass according to the present invention flows back the molten metal to both sides of the float bath through the discharge slot and the connecting channels and collects dross floating on the molten metal using the dross collecting members. Accordingly, it can prevent dross on the molten metal from staying at the downstream end of the float bath and reduce a defect rate of float glass.

Hereinabove, the present invention is described with reference to the limited embodiments and drawings. However, the description proposed herein is just a preferable example for the purpose of illustrations only, not intended to limit the scope of the invention, so it should be understood that other equivalents and modifications could be made thereto without departing from the spirit and scope of the invention.

What is claimed is:

1. An apparatus for manufacturing a float glass, including a float bath for storing a molten metal on which a molten glass flows, the molten metal flowing in the float bath, the apparatus comprising:
    a discharge slot running through approximately entirely an end wall of a downstream end of the float bath and having a predetermined size that is slightly shorter than a width of the molten glass to discharge the molten metal crashing against the end wall and dross floating on the molten metal;
    connecting channels for communicating the discharge slot with both sides of the float bath; and
    dross collecting members for collecting the dross flowing through the connecting channels.

2. The apparatus for manufacturing a float glass according to claim 1,
    wherein the discharge slot has:
        an inlet having substantially the same height as the level of the molten metal to allow an overflow of the molten metal; and
        a slope surface slanted away from the inlet.

3. The apparatus for manufacturing a float glass according to claim 1,
    wherein each of the dross collecting members comprises:
        a collecting box provided at one side of the downstream end of the float bath and communicated with the corresponding connecting channel; and
        a paddle installed rotatably at an entrance of the collecting box for scraping the dross floating on the molten metal flown back along one side of the downstream end of the float bath and collecting the dross in the collecting box.

4. The apparatus for manufacturing a float glass according to claim 1, further comprising:
    a heating unit for heating the molten metal flowing through the discharge slot and the connecting channels.

5. The apparatus for manufacturing a float glass according to claim 4, wherein the heating unit has a heater.

* * * * *